Patented Dec. 9, 1930

1,784,711

UNITED STATES PATENT OFFICE

HERMANN SUIDA, OF MODLING, NEAR VIENNA, AUSTRIA

PROCESS OF RECOVERING CRESOL FROM AQUEOUS SOLUTIONS OF SAME

No Drawing. Application filed July 6, 1926, Serial No. 120,861, and in Austria July 13, 1925.

From previous work by the applicant the preparation of concentrated acetic acid from dilute acetic acid by extracting the acetic acid from a superheated mixture of acetic acid and steam by means of extraction media, which are sparingly soluble or insoluble in water and have a boiling point substantially higher than that of acetic acid is known. In such case, the water vapor, freed from acetic acid, which issues from the apparatus, carries with it a portion of the extraction medium, since most of the media used for the process are volatilized by steam.

U. S. Patent No. 1,715,313, dated May 28, 1929, to the present applicant, discloses a process for the complete recovery of these portions of extraction medium which escape along with the steam, according to which the vapors escaping from the apparatus in which the acetic acid has been extracted are condensed and permitted to settle down in a separator where a portion of the removed solvent separates from the water, while such portions of the extraction medium as remain in solution in the water are then recovered by a special process of extraction. According to said application suitable solvents for this second extraction comprise all kinds of fatty oils, volatile fatty acids, heavy tar oils and heavy mineral oils, that is to say, substances of such high boiling points that the acetic acid extracting medium they have taken up is distilled off as the most volatile constituent, while the solvent is retained.

It has now been ascertained, that in addition to the solvents of high boiling point specified in the said patent for the purpose of recovering the acetic acid extraction media from the water, solvents containing chlorine and of low boiling point are just as suitable and, in certain circumstances, even superior. Such substances primarily comprise: trichlorethylene, chloroform, carbon tetrachloride, ethylene chloride and similar bodies. When these solvents are used, however, the process of recovering the acetic acid extraction medium, for example tar cresol dissolved in water, undergoes a substantial modification, inasmuch as, in separating the extract, the solvent, being the most volatile constituent, is now distilled off, while the acetic acid extraction medium, having the higher boiling point, remains behind. This measure results in a particular economic advantage, because the temperatures which must be employed for separating the extract into extraction medium and solvent are considerably lower than when solvents of high boiling points are used as in the process according to the aforesaid patent.

Moreover, all these chlorinated solvents have an extremely low heat of evaporation, that of trichlorethylene for example being only 58 calories, so that the consumption of heat in separating the extract by distillation is greatly reduced.

For example, assuming that tar cresol is used as the acetic acid extraction medium, the water freed from acetic acid and containing about 2½% of tar cresol in solution, can be extracted in a washing column with a fraction of its weight of trichlorethylene—about 1 part to 4 parts of cresol water. By operating on the counterflow system in the column, and at ordinary temperature, practically the whole of the tar cresol—or similar phenolic acetic acid extraction medium which may be used instead—that is dissolved in the water, passes into the trichlorethylene. In this case, the trichlorethylene, being the specifically heavier substance, is admitted into the top of the column, while the water containing the cresol ascends from below, and a solution of about 10% strength of the acetic acid extraction medium, that is to say, tar cresol, in trichlorethylene, is obtained. Owing to the practically complete insolubility of trichlorethylene in water, there is no loss of solvent in the operation. The recovered extract is then separated into trichlorethylene on the one hand and residual acetic acid extraction medium (that is to say cresol) on the other, in a continuous still in known manner. This acetic acid extraction medium is returned to the extraction process, and the distilled trichlorethylene is used for the further washing of the extraction effluent.

Instead of the aforesaid volatile solvents containing chlorine, use may be made of other solvents of low boiling point, which are insoluble or only slightly soluble in water, such as benzol, benzine, etc.

What I claim is:

The process of recovering cresol from aqueous solutions of same, comprising treating the solution with trichlorethylene, separating the solution of cresol and trichlorethylene from the water, and distilling off the trichlorethylene from the resulting solution of cresol and trichlorethylene.

In testimony whereof I have hereunto set my hand.

HERMANN SUIDA.